Figure 1:
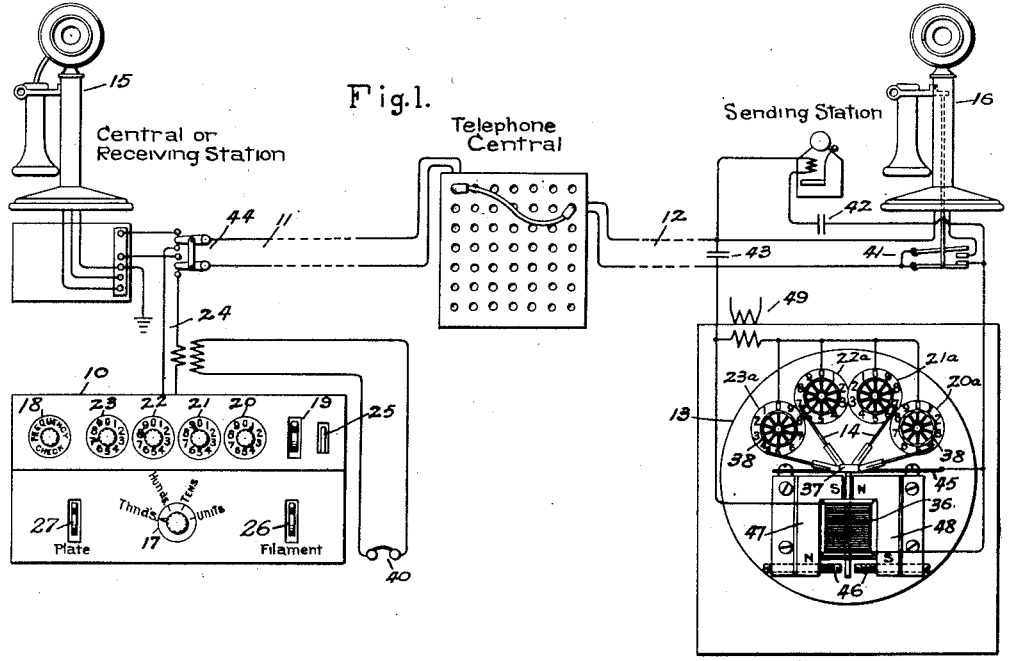

Nov. 29, 1932.  A. S. FITZ GERALD  1,889,597

TELEMETERING METHOD AND APPARATUS

Filed May 29, 1929

Inventor:
Alan S. FitzGerald.
by Charles E. Mulla
His Attorney.

Patented Nov. 29, 1932

1,889,597

UNITED STATES PATENT OFFICE

ALAN S. FITZ GERALD, OF SCHENECTADY, NEW YORK, ASSIGNOR TO GENERAL ELECTRIC COMPANY, A CORPORATION OF NEW YORK

TELEMETERING METHOD AND APPARATUS

Application filed May 29, 1929. Serial No. 367,078.

My invention relates to a method of and apparatus for telemetering, remote position signalling and the like and although not limited thereto, it is particularly useful in the remote reading of house type meters and will be described as for such use.

The common practice of reading meters such for example as gas and electric service meters, is to have a meter reader make a monthly visit to each customer and take down the readings in a note book. These readings are then taken to the office and the customer's bill is made out accordingly. Oftentimes the meter reader can not gain access to the residence or building in which the meter is installed on his first visit and he must return again when the customer is at home. Meter readers sometimes make mistakes in taking down the readings, thereby causing misunderstandings and delays. Also, the present system affords a means for unscrupulous and unauthorized persons to gain access to buildings under the pretense of reading the meter. The present system is costly, especially where the meters to be read are scattered in outlying districts.

The primary object of my invention is to provide a system and the necessary apparatus therefor whereby the readings of customers' meters, such as those commonly used for measuring gas, electricity and the like, may all be obtained at a common point such as the central station or main office of a public service corporation, or the central station of a telephone system.

It goes without saying that any remote meter reading system in order to be practicable must be highly reliable and accurate and the necessary apparatus which is attached to each meter must not be so expensive as to prevent the adoption of the system.

Another object of my invention is to provide a meter reading system wherein the above mentioned requirements of practicability are complied with. To this end the apparatus associated with each meter is made as simple as possible consistent with reliability and the action thereof supplemented by a more expensive receiving apparatus at the central station. Since one receiving apparatus is sufficient for any number of meters, the expense of constructing the receiving apparatus is not so important a consideration.

Another object of my invention is to provide a system as above outlined which requires but a single pair of wires or a single complete electric circuit between the sending and receiving apparatus. This feature enables me to make use of the ordinary telephone circuit for meter reading purposes.

Another object of my invention is to provide a meter reading system which may be applied to existing meter installations with slight modifications thereof. Other objects and advantages of my invention will appear as the description proceeds.

The method which I use in the solution of the problems presented differs somewhat from the usual telemetering method of having the apparatus at the meter transmit an elaborate group of position indicating signals. My method recognizes the principle that it is desirable to reduce to a minimum the functional burden imposed upon the meter and to transfer as far as possible the work to be done to the central station equipment. Instead of requiring that the meter transmit a signal indicating its reading I transmit a signal to the meter from the central station to find out what the reading is. Expressing this thought figuratively, instead of asking the meter to tell what each of its dial indications may be, I employ a method which asks the meter whether the reading of each dial is 1, 2, 3 or 4, etc. and only require that the meter shall answer "yes" when asked the proper question.

Figure 2:
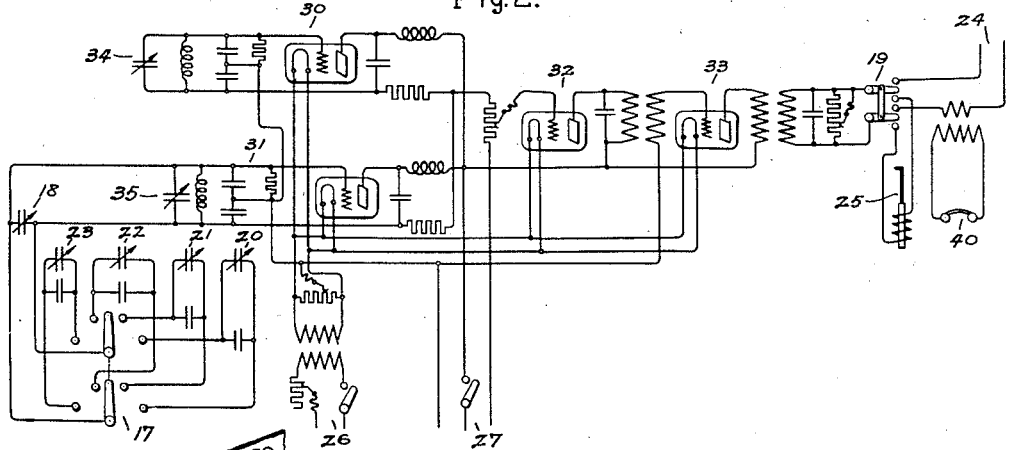
Figure 3:
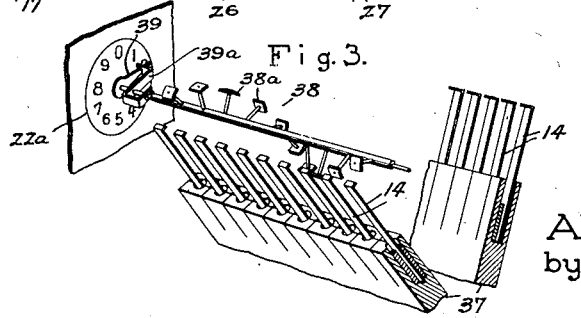

In carrying this method into effect I employ at the central station means for successively transmitting a plurality of selective currents such as currents of selective frequencies over a circuit to the remote meter. The meter is provided with a plurality of selective electrically operated devices such as vibratory reeds corresponding to the several dial figures of the meter in number and so associated with respect to the dial pointers or parts moved thereby that they will make a signalling modification of the current in the circuit when selectively operated if the pointer is on the corresponding dial indication. When such signalling modification occurs a signal is transmitted back to the central station and the central station operator knows by reason of the selective nature of the current being transmitted when he receives such signal that the meter dial pointer indicates a position corresponding to that particular selection. Such is one way of stating the general principle of operation involved in my invention. However, to obtain a better understanding thereof and of the apparatus employed for carrying the invention into effect, reference is made in the following description to the accompanying drawings in which Fig. 1 represents the system employing the selective frequency principle as connected between the apparatus at the central station and the customer's meter through the existing telephone circuit and telephone central; Fig. 2 shows one form of a variable frequency oscillator circuit that may be employed at the central office for transmitting different selected frequency currents and for detecting modifications in such currents when an answer back signal occurs; and Fig. 3 shows details of the frequency responsive devices and their association with the movable pointer of a meter dial.

Fig. 1 shows the general arrangement of the apparatus which I have found feasible for reading meters over telephone circuits employing a selective frequency principle of operation. At the central or signal receiving station there is provided apparatus for transmitting different selective currents. For this purpose I have employed an audio frequency generator of the vacuum tube type. This apparatus is housed in a cabinet 10 resembling in some respects a radio receiving set and is provided with dials and frequency varying means by means of which currents of any frequency lying between for instance 200 and 1000 cycles may be emitted over the telephone circuit 11 to the telephone central and from there over any one of a number of telephone circuits 12 to any one of a number of sending stations each equipped with a meter 13 or other position indicating device the reading of which it is desired to ascertain.

The meter 13 is provided with a plurality of selective frequency responsive devices comprising tuned reeds 14 associated with the meter dials, there being a reed for each selected graduation of each dial. When a reed corresponding to a dial indication vibrates it produces a signal which is transmitted back to the receiving station where means are provided for detecting such signals.

At the sending and receiving stations I have shown the usual telephones 15 and 16 to indicate more fully the connections and the manner of operation which does not interfere with the use of the telephone as such or disturb the subscriber at the sending station by causing his telephone bell to ring when it is desired to read the meter.

The apparatus 10 at the central station is provided in this instance with six dials indicated by reference characters 17, 18, 20, 21, 22, 23, respectively. Dial 17 has four graduations, reading as follows: units, tens, hundreds, and thousands and is connected to a four-point transfer switch to transfer frequency control to dials 20, 21, 22 or 23 as desired. Dial 18 is employed to initially calibrate the oscillator to a definite frequency range of operation and a switch 19 is provided to transfer the output connection of the oscillator from the lines 24 to a frequency responsive measuring device indicated at 25 for calibrating purposes. Dials 20, 21, 22 and 23 control the selective frequencies employed for operation of the selective frequency responsive devices at the meter 13 and are graduated in the same units as the meter dials 20a, 21a, 22a and 23a, so that in a meter reading operation the readings of the units, tens, hundreds and thousands, dials of the meter can be read directly from the corresponding dials 20, 21, 22 and 23 at the central station as will subsequently be explained. The switches indicated at 26 and 27 are those employed for energizing the frequency oscillating generator.

While it may not be necessary to explain the details of a frequency oscillation generator, I have shown in Fig. 2 one such generating apparatus and circuit which I have used with satisfactory results with this invention and I will now proceed to explain the essential features of this oscillation generator circuit, but of course without limiting my invention either to an oscillation generator or to the particular frequency generating means now to be described. In Fig. 2 I have numbered the control devices already referred to in Fig. 1 with similar reference characters in Fig. 2. Thus dial 20 of Fig. 1 controls the variable condenser 20 of Fig. 2. The apparatus and connections shown in Fig. 2 is a well known beat oscillator circuit and will be understood by those familiar with such circuits without further explanation. In general, it comprises a fixed oscillator at 30, a variable oscillator at 31, a beat oscillator at 32 and an amplifier at 33 feeding the output circuit 24 through switch 19. The filaments of all the tubes employed in the circuit are energized through a switch 26 from an alternating current circuit of 60 cycles or other suitable source. Plate energy for supplying the oscillation generators is obtained through a switch 27 from a suitable source such as a storage battery.

It will be understood that the fixed oscillating generator 30 is arranged to produce a fixed high frequency current of the order of 18 kilo cycles which is impressed upon the beat oscillator 32 and that the variable oscillator 31 is arranged to produce a high variable frequency current which is likewise impressed upon the beat oscillator 32. The beat oscillator in turn produces a variable frequency equal to the beat frequency or equal to the difference between the frequencies produced by the two oscillation generators 30 and 31. The variable condensers 34 and 35 of the fixed and variable oscillators are inside the cabinet and after being initially adjusted to produce the desired frequencies are left in such adjustment. However the condenser 35 is connected in parallel with the circuit leading to the calibrating condenser 18 which in turn is connected in parallel with the four-point switch 17 so as to be connected with any one of the four variable condensers 20, 21, 22 and 23. Thus by the adjustment of condenser 18 and the condensers 20, 21, 22 and 23 when connected, we may vary the frequency produced by the variable oscillator and in turn vary the lower beat frequency as desired within the limits determined by the initial adjustment of the apparatus.

In the use of this apparatus for generating the different selective frequencies the switch 19 is first thrown to test position connecting the output circuit of amplifier 33 to the frequency responsive test device 25 which is a reed tuned to vibrate at a definite frequency corresponding to some definite adjustment of the set when in calibration. For example, with the switch 17 turned to the left to connect variable condenser 23 in parallel with condenser 18 and with the pointer of dial 23 on the zero indication I vary condenser 18 until reed 25 is set into vibration. The apparatus is then calibrated for operation and in the subsequent use, condenser 18 is left in this particular adjustment with the assurance that we may now generate a number of definite selected frequencies by further adjustments of the condensers which are arranged to be connected in parallel with 18 through the four-point switch 17. For example, with switch 17 connecting condenser 23 in parallel with 18 we may, by varying condenser 23, generate beat frequencies of 480 to 580 cycles in ten steps for the ten different positions of dial 23 indicating 1 to 10 respectively. Condenser 22 is then connected to generate frequencies over a range for example from 380 to 460 cycles in ten steps for the ten indicating positions of dial 22. Condenser 21 is used over another range of frequency, say from 280 to 360 cycles and condenser 20 is used to produce frequencies over a range of from 200 to 260 cycles. These selected frequencies are sent over the circuit to the sending station by throwing switch 19 to a meter reading position when the proper telephone connections are made. It will thus be seen that by adjustment of the four dials 20 to 23 through the ten steps provided for each dial forty different definitely selected frequencies may be produced.

Having thus described the essential features of one arrangement for producing definite selective currents I will now proceed to describe a form of apparatus located in the distant meters to which such selective currents are responsive.

The meter 13 shown in Fig. 1 has in addition to its usual structural features certain selective frequency responsive signalling equipment which may be added to its front without modification of the meter except providing a larger cover to accommodate the added equipment. This additional equipment is the same for all meters to be read over the system and consequently the added equipment may be standardized and made in large quantities at small cost per equipment. In this instance the added equipment comprises a single coil 36 connected to the telephone circuit which enters the customer's premises so as to receive the various different selected frequencies sent out from the central station. The energizing coil 36 produces a flux in a magnetic core structure 37 arranged to shake or vibrate slightly in response to the different frequency currents. This core structure is supported on stiff springs 45 and its movement is limited by adjustable stop screws 46. A pair of permanent magnets 47 and 48 have pole pieces approaching the upper and lower ends of the core 37 to produce poles of different polarity on opposite sides of the member 37 at both ends as indicated. The alternating flux produced by coil 36 in the core 37 cooperates with the fields produced by the permanent magnets to vibrate the core. To this core is secured a plurality of vibratory reeds 14 equal in number to the graduated indications on the meter dials. For a four-dial meter each having ten indications there will be forty reeds, ten for each dial. These forty reeds will be individually tuned to vibrate at the forty different selected frequencies respectively. As shown, the ten reeds corresponding to a particular dial are arranged in a group adjacent to a rotary segmental contact drum 38 made in skeleton form for the sake of lightness so as to be driven from the dial pointer 39 through a forked arm 39a without imposing appreciable load on the meter. Fig. 3 shows the details of this arrangement for one of the meter dials. Each rotary part 38 carries 10 contact fingers or segments 38a equally spaced along the shaft thereof and mounted in angular relation one-tenth of a revolution apart. The ten reeds corresponding to a dial group are spaced axially so as to have their free ends adjacent the path of movement of these contact segments. The contact segments 38a form sections of a cylindrical surface in axial dimensions equal to the width of a reed and exactly 36 degrees apart circumferentially.

The reeds are furnished with contact points which when they are stationary do not come in contact with any of the segments. However, when a reed vibrates in response to its selected frequency it will make contact with the particular segment to which it corresponds if the segment happens to be opposite the reed. Thus in each group of ten reeds it is only possible for one reed to make contact for any given position of the meter pointer and since the contacts are arranged in the form of a spiral as shown the position of the dial pointer is known if we know which reed makes contact. Since each reed is tuned to one of the distinctive frequencies sent out from the central station, which frequency is determined and known by the position of the dial used at the central station for producing such frequency we can determine the position of the meter dial and identify the dial by having the contacting surfaces send a signal back to the central station when such contact occurs.

I have found that if such contact between the reed and segment is arranged to short-circuit the coil of the shaking magnet a modification of the current sent out from the central station occurs which may be readily detected at the central station. Working over several miles of telephone line I have found that the change in the total impedance of the circuit which results from the transient short-circuiting of the shaking coil 36 causes a very abrupt change in the current going out from the central station which may be detected by any suitable current responsive device designed for that purpose. For example, if we connect a telephone receiver 40 through a current transformer in line 24 as at the central station as shown in Figs. 1 and 2, a sharp click is heard in the telephone when the contact occurs. Thus, one side of coil 36 is connected to the core structure and the other side to the metallic rotary contact devices 38 and these parts are insulated from each other causing the coil 36 to be short-circuited when a vibratory contact occurs.

The four dials 20, 21, 22 and 23 at the central station are graduated in the same units and numbers of graduations as the four meter dials 20a, 21a, 22a and 23a. The ten reeds adjacent dial 20a are respectively tuned to vibrate at the ten frequencies obtained by the adjustment of dial 20. The ten reeds adjacent dial 21a are respectively tuned to vibrate at the ten frequencies obtained by the adjustment of dial 21a, etc. When dial 20 indicates the number 2 for example, the only reed which can vibrate is that reed of this dial group corresponding to the number 2 on dial 20a and this reed will make a signalling contact only when the pointer of dial 20a points to 2. If the meter pointer of dial 20a is on 6 the signalling contact for this dial group can be made only when the corresponding dial 20 indicates 6. The same arrangement is carried out for each dial group and it is thus seen that the operator at the central station can quickly ascertain the reading of any number of meters so equipped over telephone or other circuits.

It is desirable, although not essential, that the use of the telephone circuit for this purpose shall not disturb the customer by causing the ringing of his telephone bell. It is of course essential that the meter reading connection shall not interfere with the telephone as such. One of the usual telephone connections is represented in Fig. 1 at the sending station where 16 represents the house telephone where the meter 13 is installed. The switch 41 is the usual switch inside the telephone pedestal although shown outside for the sake of clearness. This switch is operated by taking off and hanging up the telephone receiver on its hook. When the receiver is on as shown the telephone line 12 is connected to the telephone bell circuit through a condenser 42. The low frequency bell ringing current may thus cause the bell to ring. The subscriber takes off the receiver and switch 41 opens the bell ringing circuit and closes the circuit to the telephone microphones. The meter circuit to coil 36 is connected in parallel with the bell circuit through a condenser 43. The frequency generally employed for telephone bell ringing purposes is low, for example 15 cycles. Due to the value of capacity 43 this current will not flow in the meter reading circuit to any appreciable extent. The much higher frequency employed for meter reading will not cause the bell to ring since the constants of the bell circuit and the bell itself are such as not to respond to this higher frequency. Consequently a meter reading operation does not cause the telephone bell to ring and the meter connection in no way interferes with the use of the telephone.

With this particular arrangement the meter could not be read while the telephone was in use but this is of no consequence since the meter is read only once per month and preferably during the early morning hours when the telephone load is at a minimum. Other arrangements may be employed to suit the different telephone practices employed in different localities and where objection is made to having the meter circuit permanently connected to the telephone circuit a frequency responsive relay may be employed to close the meter reading circuit during a meter reading operation.

I will now describe the procedure for reading a meter over the telephone circuit by the use of my invention. The operator at the central station has his telephone connected by a two-way switch shown at 44. This switch will normally connect the telephone 15 to line 11. He calls the telephone central and says, "Give me number ——. I wish to read the meter." He then throws switch 44 down connecting the oscillator to the telephone line 11. The telephone operator merely plugs in the proper connections but does not close the bell ringing circuit as she usually does when making a telephone connection. The oscillator is then connected to the meter. The central station operator closes the switches 26 and 27, checks the calibration of the oscillator as previously described and proceeds to read the meter to which he is connected. With switch 17 turned to the thousands indication he turns dial 23 until he hears the definite click in the telephone receiver 40. He then turns dial 17 to the hundreds indication and turns dial 22 until he hears the responsive click in the telephone receiver, and so on for the remaining dials. The readings of the four dials 20 to 23 then correspond to the distant meter reading and the operator then takes down this reading on the card corresponding to the residence called. He then throws switch 44 to the telephone and asks central to give him another number for meter reading and proceeds as before. If desired, he may check the oscillator calibration after each reading although this is generally unnecessary.

The range of frequencies previously mentioned may not be the most desirable under all circumstances but for the usual telephone circuit I have found it preferable for several reasons. It is well above the bell ringing frequencies usually employed and it is therefore easy to arrange matters so as not to ring the telephone bell in reading a meter. Frequencies lower than about 200 cycles do not transmit so readily by telephone. Frequencies exceeding about 1000 are subjected to greater attenuation. The frequencies between 200 and 1000 are best suited for operating selective vibratory reeds. Therefore this frequency range seems to be best suited for the usual installation of this form of my invention.

There are two easy ways to tune the reeds. It will be noted in Fig. 3 that the base of the reeds are secured in a metal plug fitting into sockets. By varying the length of these plugs the free portion of the reed may be easily varied. Final adjustment can be made by a little solder at the tip of the reed. I have found that a reed with a slight weight at its end obtained by bending it at right angles as shown assists the vibratory action and gives sharper tuning. For long telephone lines I have found it desirable to connect a small source of E. M. F. such as a bell ringing transformer 49 in the signalling circuit to supply a small amount of additional energy at the meter end of the system when a contact is made. The system may be adapted for automatic telephone systems by suitable provision therefor at the telephone central consisting chiefly in providing means for omitting the bell ringing connection when a meter reading is desired.

A further set of vibratory reeds may be provided with each meter for meter identifying purposes but since these would be different for each meter and the meter can otherwise be easily identified through the telephone number it seems better to omit this feature in practice.

Having described the principle of operation of my invention and apparatus which I have found to be satisfactory for carrying it into effect I desire to state that I do not wish to limit myself to any particular arrangement of apparatus, or selective current system of operation, or to any particular position signalling application but seek to cover in the appended claims such variations as come fairly within the true spirit and scope of my invention.

What I claim as new and desire to secure by Letters Patent of the United States is:

1. In an electric position signalling system, a movable device adapted to assume any one of a number of selected positions, a selective frequency responsive mechanical vibrator for each such position, said vibrators being arranged to respond to different selected frequencies, the movable device having parts consecutively moved into close proximity with the respective vibrators such that a vibrator corresponding to the position of the movable device will contact therewith when in vibration, an electromagnet for all of said vibrators having a coil short-circuited by contact between a vibrator and the movable device, a circuit connected to said coil, means at a remote point for transmitting selected frequencies over said circuit to said coil, and means at said remote point for detecting when said coil is short-circuited.

2. In an electric position signalling system, a movable device adapted to assume any one of a number of different selected positions, a selective frequency responsive device comprising a vibratory reed for each such position, said devices being selective to different frequencies, electro-magnetic means for vibrating said frequency responsive devices, an energizing circuit therefor, means at a remote point for transmitting different selected frequency currents over said circuit to said electro-magnetic means, means responsive to the position of said movable device for modifying the magnitude of the transmitted current when the frequency responsive reed corresponding to such position responds, and means at said remote point for detecting such modification.

3. An electric position signalling system, comprising a meter having a plurality of graduated dials, movable pointers for each dial, selective frequency responsive devices for different graduations of each dial, the devices corresponding to the different graduations of a dial being responsive to different frequencies in a given range and the devices for different dials being responsive to different frequency ranges, energizing means for said devices, a circuit therefor, means at a remote point for transmitting currents of the different selected frequencies over said circuit to said energizing means, said transmitting means having indicating dials and pointers corresponding to those of the meter so arranged that when corresponding dials give the same indication and the frequency being transmitted is in the range allotted to such dials the device corresponding to such indication responds, means responsive to the position of any meter pointer for modifying the transmitted current when the frequency responsive device for such position and pointer responds, means at the remote point for detecting such modification, and other means for indicating the frequency range then being transmitted.

4. An electric position transmitting system including a meter having a plurality of dials having selected graduations, pointers moved by the meter over the dials, a selective electrically operative vibratory reed for each of the different graduations on the several dials, electrically selective means at a remote point having a corresponding number of similarly graduated dials and pointers for successively causing the electric operative reeds corresponding to the dials and graduations to vibrate, means causing said reeds to transmit a signal in their operation whenever a meter pointer is opposite the dial graduation corresponding to the vibrating reed and means at the remote point for detecting such signals.

In witness whereof, I have hereunto set my hand this 29th day of April, 1929.

ALAN S. FITZ GERALD.